United States Patent
Giger et al.

(10) Patent No.: US 9,599,713 B2
(45) Date of Patent: Mar. 21, 2017

(54) DISTANCE-MEASURING DEVICE

(71) Applicant: LEICA GEOSYSTEMS AG, Heerbrugg (CH)

(72) Inventors: Kurt Giger, Rüthi (CH); Reto Metzler, Rebstein (CH); Bernhard Fiegl, Marbach (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 456 days.

(21) Appl. No.: 14/356,130

(22) PCT Filed: Oct. 31, 2012

(86) PCT No.: PCT/EP2012/071619
§ 371 (c)(1),
(2) Date: May 2, 2014

(87) PCT Pub. No.: WO2013/064570
PCT Pub. Date: May 10, 2013

(65) Prior Publication Data
US 2014/0307248 A1 Oct. 16, 2014

(30) Foreign Application Priority Data
Nov. 4, 2011 (EP) .................................. 11187964

(51) Int. Cl.
*G01C 3/08* (2006.01)
*G01S 17/10* (2006.01)
*G01S 7/483* (2006.01)

(52) U.S. Cl.
CPC .............. *G01S 17/10* (2013.01); *G01S 7/483* (2013.01)

(58) Field of Classification Search
CPC ................................ G01S 7/483; G01S 17/10
(Continued)

(56) References Cited

U.S. PATENT DOCUMENTS

| 6,067,331 A | 5/2000 | Garcia |
| 6,545,749 B1 | 4/2003 | Andersson |

(Continued)

FOREIGN PATENT DOCUMENTS

| CN | 101726746 A | 6/2010 |
| DE | 03439386 A1 | 5/1986 |

(Continued)

OTHER PUBLICATIONS

European Search Report dated Apr. 27, 2012 as received in Application No. EP 11 18 7964.

*Primary Examiner* — Mark Hellner
(74) *Attorney, Agent, or Firm* — Maschoff Brennan

(57) ABSTRACT

The invention relates to an electro-optical distance-measuring device, more particularly a laser rangefinder, with a transmitting unit for transmitting intensity-modulated optical radiation, a receiving unit for receiving a portion of the optical radiation reflected back from a target in a photosensitive electrical component and converting it into an electrical received signal, an input filter for filtering the received signal, an analog-to-digital converter for digitizing the filtered received signal and an electronic analysis unit that calculates the distance from the rangefinder to the target object on the basis of a signal propagation time using the digitized received signal. The input filter is implemented as a time-discrete and continuous-value filter structure, more particularly a digital filter structure.

21 Claims, 9 Drawing Sheets

(58) Field of Classification Search
USPC ........................................................ 356/5.01
See application file for complete search history.

(56) References Cited

U.S. PATENT DOCUMENTS

| | | | |
|---|---|---|---|
| 6,929,643 B2 * | 8/2005 | Ohyama | A61B 18/149 606/32 |
| 7,215,462 B2 * | 5/2007 | MacFarlane | G02B 6/12004 359/337.21 |
| 2004/0135992 A1 | 7/2004 | Munro | |

FOREIGN PATENT DOCUMENTS

| | | |
|---|---|---|
| DE | 03447929 C1 | 12/2000 |
| EP | 1 752 788 A1 | 2/2007 |
| EP | 1957668 A1 | 8/2008 |
| EP | 2 183 865 B1 | 5/2010 |
| EP | 11180282 A1 | 3/2013 |
| EP | 2 568 547 B1 | 4/2014 |
| WO | 2006/063740 A1 | 6/2006 |
| WO | 2007/022927 A1 | 3/2007 |
| WO | 2009/062306 A1 | 5/2009 |
| WO | 2011/076907 A1 | 6/2011 |
| WO | 2011/082481 A1 | 7/2011 |

* cited by examiner

DISTANCE-MEASURING DEVICE

FIELD OF THE INVENTION

The invention relates to a distance-measuring device and a distance-measuring method.

BACKGROUND

In electro-optical distance-measuring devices (EDM), an optical signal is emitted from the instrument in the direction of the target object—whose distance it is necessary to determine—for example as optical radiation in the form of laser light. In order that the point targeted for measurement on the target object is made discernible, visible light can be used in this case. The surface of the target object reflects at least part of the optical signal, usually in the form of a diffuse reflection. The reflected optical radiation is converted into an electrical signal by a photosensitive element in the instrument. With knowledge of the propagation velocity of the optical signal and with the aid of the ascertained propagation time required for covering the distance from the instrument to the target object and back, it is possible to determine the distance between instrument and target object. In this case, optical components for beam shaping, deflection, filtering, etc.—such as, for instance, lenses, wavelength filters, mirrors, etc.—are usually situated in the optical transmission and/or reception path. In order to compensate for influences which might corrupt the measurement results (for example temperature influences, component tolerances, drifting of electronic components, etc.), part of the emitted optical signal can be guided as a reference signal via a reference path of known length from the light source to the light-sensitive receiving element. In this case, the reference path can be fixedly incorporated in the instrument or be designed as a deflection element that can be pivoted in or plugged on, for example. The reception signal resulting from said reference signal can be received by the photosensitive element used for measurement or by a dedicated photosensitive element. The resulting electrical reference signal can be used for referencing/calibrating the measured values ascertained.

In order to obtain a correspondingly high accuracy of the distance measurement, on account of the high propagation velocity of optical radiation in free space, the requirements made of the temporal resolution capability for distance measurement are extremely high. By way of example, for a distance resolution of 1 mm, a time resolution having an accuracy of approximately 6.6 picoseconds is required.

In this case, the emitted optical signal is modulated in its intensity amplitude. Besides optical signals, electromagnetic waves having other wavelengths can also be used analogously, for example radar waves, ultrasound, etc.

With regard to the signal power that can be emitted, however, limits are predefined for the electro-optical EDM under consideration here. In this regard, when laser light is emitted, eye safety determines a maximum permissible average signal power which is allowed to be emitted. In order nevertheless to obtain for the measurement sufficiently strong signal intensities which can be detected by the receiver, pulsed operation is therefore employed. Short pulses having a high peak power are emitted, followed by pauses without signal emission. Consequently, the reflected portion of the pulses has a sufficiently high intensity to be able to evaluate the latter from the background disturbances and noise, in particular even when background light (sunlight, artificial lighting, etc.) is present.

As described in EP 1 957 668, for instance, the emission of packets of pulses followed by pauses without pulse emission—so-called burst operation—especially affords not only the advantage of a reduced average power of the signal, but additionally also advantages in the achievable signal-to-noise ratio (SNR). Firstly, therefore, the signal intensity can be correspondingly higher during the active burst time than in the case of continuous emission—without exceeding the average power limit in the process. Secondly, moreover, the noise is taken up only in the time windows during the active burst duration—but not during the blanking intervals, since no signal evaluation takes place during the latter. By means of a duty cycle of the bursts e.g. of 0.1 or 1:10 or 10% (10% of the burst duration of signal emission+90% pause), it is thus possible to achieve an improvement in the SNR of approximately the square root of 1/duty cycle, that is to say in the example of 10% an improvement by a factor of more than 3. The number of pulses per packet can be varied depending on the evaluation concept and measurement situation, through to individual pulses (in which case the term bursts is then generally no longer employed).

In order to ascertain the propagation time of the signal, firstly the so-called time-of-flight (TOF) method is known, which ascertains the time between the emission and reception of a light pulse, wherein the time measurement is effected with the aid of the edge, the peak value or some other characteristic of the pulse shape. In this case, pulse shape should be understood to mean a temporal light intensity profile of the reception signal, specifically of the received light pulse—detected by the photosensitive element. In this case, the point in time of transmission can be ascertained either with the aid of an electrical trigger pulse, with the aid of the signal applied to the transmitter, or with the aid of the reference signal mentioned above.

In the distance measurement, ambiguities can occur if the signal propagation time exceeds the reciprocal of the pulse or burst transmission rate and a plurality of signals are thus travelling simultaneously between instrument and measurement object, as a result of which a reception pulse or reception burst can no longer be assigned unambiguously to its respective transmission pulse or transmission burst. Without further measures it is thus unclear whether the distance or an integral multiple thereof was measured.

Secondly, the so-called phase measurement principle is known, which ascertains the signal propagation time by comparison of the phase angle of the amplitude modulation of the transmitted and received signals. In this case, however, the measurement result in the case of one transmission frequency has ambiguities in units of the signal period duration, thus necessitating further measures for resolving these ambiguities. By way of example, WO 2006/063740 discloses measurement with a plurality of signal frequencies which result in different unambiguity ranges, as a result of which incorrect solutions can be precluded. WO 2007/022927 is also concerned with unambiguities in phase measurement.

In EDMs, on account of the high temporal resolution required, a temporal stretching of the reception signal (besides direct signal evaluation) by means of heterodyne down-conversion of the input signal, received by means of the photoelectric element, to a baseband of lower frequency is known. The slow baseband signal can be evaluated more easily, but a considerable part of signal information and signal energy is lost without being used during the down-conversion. This topic is also dealt with in WO 2006/063740, for example. A further challenge is posed by the high frequency mixers required for this purpose, since they are complex in their embodiment and often also nonlinear. By way of example, an avalanche photodiode (APD) often employed for this purpose as a mixing diode on the one hand is complex in terms of driving technology and on the other hand also yields only moderately good mixing results.

For mixing purposes, a plurality of frequencies or phase-offset signals have to be employed, moreover, in the system. These frequency or phase-offset signals tend toward severe crosstalk effects and associated disturbances of the measurement signals, especially in the evaluation electronics. Moreover, the different frequencies also have to be generated (e.g. by a synthesizer, PLL, DLL, etc.), for which purpose further system components are required. Moreover, frequency and/or phase changes always require certain transient recovery times in the electronics, especially in the analogue filters and components.

The signals, supplies, etc. in the electronic system of an EDM have to be correspondingly filtered in order to suppress interference, which can prove to be additionally difficult in the case of changing frequencies. The transient processes of the filters during the measurement can, moreover, lengthen the required evaluation time or reduce the evaluation performance. By way of example, in the case of burst operation, the first pulses of the received burst often cannot be used for the evaluation, since they are still corrupted owing to transient processes in the electronics. Moreover, the HF filter circuits used should be constructed in discrete and analogue fashion, since a digital filtering would first necessitate digitization with a very high temporal resolution, which is not—or at least not economically—feasible e.g. in handheld construction site measuring instruments. In contrast to digital filtering, however, the analogue filtering drastically restricts the achievable filter characteristics and also the options for filter parameter adaptation—in particular with regard to the propagation time.

Besides the mixing EDM systems, the so-called direct sampling or HF sampling systems are also known. In these systems, the high frequency (if appropriate amplified and/or transimpedance-converted) output signal of the photosensitive element is fed as high frequency (HF) signal directly to an analogue-to-digital conversion (ADC). On account of the high temporal resolution required in a distance measurement, a correspondingly fast and more expensive (ultra) high speed ADC, as it is called, is necessary for this. Such fast and high resolution ADCs are too expensive for handheld construction site measuring instruments, for example, and have an excessively high power consumption and the semiconductor structures used in that case are highly specialized and often cannot be produced by means of standard semiconductor processes. If the sampling rate is considered relative to the resolution of the ADCs that are commercially available as standard, then as a rule of thumb a doubling of the sampling frequency is accompanied, for instance, by a reduction of the amplitude resolution by one bit. An increase in the sampling frequency of an analogue-to-digital converter is therefore usually also accompanied by the reduction of the bit depth or amplitude resolution, which is significant for a precise determination of the phase angle, however, since the extreme case of a one-bit resolution would correspond virtually to a TOF measurement. The further processing of the flood of digital measurement data that arises during fast and high resolution analogue-to-digital conversion, in particular in real time, also places enormous demands on the evaluation hardware, which is also accompanied by an increased power consumption, inter alia.

Furthermore, every digitization also brings about down-conversion of the multiples of the sampling frequency—so-called aliasing. Therefore, corresponding signal filters that are as steep as possible are required upstream of the digitization, said filters suppressing these aliasing frequencies above half the sampling frequency of the ADC to a sufficient extent in order to avoid corruption of the measurement signal by aliasing effects or to reduce the latter to an acceptable extent. In this case, strictly speaking, half the sampling frequency corresponds to the bandwidth of the measurement signal to be digitized (wherein the bandwidth need not necessarily be in the baseband—that is to say need not begin at a frequency of zero). The analogue high-order high frequency filters required for aliasing filtering are often correspondingly complex in terms of their circuitry construction and, in the case of the high orders required, tend toward free oscillations or instabilities. In addition, for an accurate distance measurement, a filter having a linear phase response is desirable in order to make the group delay of the pulses that are to be evaluated as frequency-independent as possible and thus to avoid or minimize dispersion of the pulse shape. Even in the case of an evaluation with inclusion of a reference signal, such effects of the evaluation circuit cannot be compensated for, or can be only partly compensated for.

By way of example, WO 2011/076907 discloses a directly sampling distance-measuring device comprising an at least $7^{th}$ order low-pass filter as aliasing filter upstream of the analogue-to-digital conversion of the HF signal by means of a fast ADC. US 2004/135992 describes a distance-measuring device comprising an analogue resonance amplifier as input stage and a subsequent signal digitization of the resonance amplifier output. Mention is also made of the possibility of a subsequent IIR or FIR filtering of the digitized reception signals in the context of the distance determination by the digital computer.

As aliasing filters, the finite impulse response filters (FIR filters) known from digital filter technology would be well suited on account of their filter characteristic (which is also configurable and parameterizable in wide ranges). However, these filters are implemented digitally, whereas the aliasing must already be suppressed before the digitization since, in the digitized representation, it can virtually no longer be distinguished from the actual measurement signal. The approach of oversampling for digital aliasing filtering is not considered in the application described here, on account of the high sampling frequencies that are already necessary anyway in a manner governed by the application. Digital filters, in particular FIR filters, are therefore used in the prior art only after the digitization—and thus not for avoiding aliasing, but rather for other signal conditionings.

Crosstalk effects in electronics also constitute a further limiting factor with regard to achieving high distance accuracies in the prior art. In this case, firstly, the transmitter with the short pulses having high amplitude values as desired in a manner governed by the application is a potential broadband interference source.

Moreover, signals having a wide variety of frequencies and/or phase angles which are required for distance evaluation on the same electronics board also prove to be problematic with regard to crosstalk, especially in the case of direct HF sampling. Corresponding filtering or some other suppression of the different frequencies in the system, in particular also of phase-shifted signals having (at least approximately) identical frequencies, proves to be difficult. If a mixed frequency shifted relative to the transmission frequency and/or sampling frequency is used, then these frequencies can interfere with the usually sensitively designed analogue circuits of the receiving module and corrupt the measurement signals or superimpose additional interference thereon.

To summarize, the present invention is established in the field of laser distance measurement with high frequency direct sampling (HF sampling). In this technology, the received, modulated high frequency signal is sampled without analogue mixing as a matter of priority. In order in this case to obtain enough support values for an accurate evaluation of the signal propagation time, in the prior art the HF signal has to be sampled with a higher rate than the signal frequency to be evaluated, in accordance with the sampling theorem at least at the so-called Nyquist frequency (or higher, which is also designated as oversampling).

SUMMARY

Some embodiments may of the present invention improve an optoelectronic distance-measuring device, in particular to achieve an increase in the distance measuring accuracy, the measuring rate and/or an increase in the sensitivity.

Some embodiments may improve the evaluation of the reception signal in the EDM, specifically with regard to suppressing interference and improving the achievable signal/noise ratio.

Some embodiments may improve the sampling of a high frequency output signal of the photosensitive element, specifically from economic standpoints, such as reducing the required digitization rate, avoiding analogue tuning processes during the production of instruments, reducing the number of components and component costs.

Some embodiments may condition the reception signal before the evaluation of propagation time or distance with the aid of the digitized signal information. In this case, one partial object is also to improve the signal filtering in the receiving circuit of the EDM. In this case, further partial objects include avoiding crosstalk within the EDM system and developing a correspondingly adapted measurement and evaluation concept, which can also be considered per se as independent inventions.

According to the invention, in this case, the advantages of digital filter structures are introduced in the EDM receiving circuit, without in this case requiring analogue-to-digital conversion with high temporal and amplitude resolution, as this for instance in the context of an EDM receiving circuit with a direct ADC conversion complying with the Nyquist condition of the reception signal, or even of a system with oversampling and FIR filtering of aliasing.

This is achieved by means of a time-discrete, but value-continuous implementation of the filter structure. In this case, the advantages of time-discrete filtering with a finite impulse response, such as is known from an FIR filter, for instance, are combined with an analogue signal representation. In this case, the time-discrete construction opens up the advantages known from digital filtering, such as, for instance, flexible parameterizability, transient response, stability, etc. In this case, the analogue signal representation and processing avoids quantization effects and a high data rate and also the associated requirement for a fast digital computing unit for signal processing that implements the filter algorithm.

By means of the efficient and purposeful filtering thus achieved, undersampling of the signal filtered according to the invention can thus be carried out for example also by means of targeted suppression of otherwise problematic aliasing frequency ranges, without the desired measurement result being appreciably impaired in this case. It is thus possible to carry out the analogue-to-digital conversion with a low temporal rate, which makes it possible, for example, to dispense with highly specialized, fast ADCs.

Particularly since such a structure can be realized with standard semiconductor processes, such a structure can be economically integrated into an EDM evaluation circuit.

The invention is concerned with an electro-optical distance-measuring device, in particular laser distance-measuring device, comprising:

a transmitting unit, in particular comprising a laser diode and a laser diode driver, for emitting intensity-modulated optical radiation, in particular as burst-modulated radiation having a burst rate, a burst duty cycle and a pulse frequency within a burst, a receiving unit for receiving a portion of the optical radiation, said portion being reflected from a target object, by means of a photosensitive electrical component with an electrical output signal as reception signal, in particular with a photodiode, an input filter for filtering the reception signal, an analogue-to-digital converter for digitizing the filtered reception signal, and an electronic evaluation unit, which ascertains a distance from the distance-measuring device to the target object on the basis of a signal propagation time with the aid of the digitized reception signal.

In this case, the input filter is a, in particular digital, filter structure implemented in a time-discrete and value-continuous fashion, in particular an FIR filter structure.

The input filter can be constructed having a time-quantifying, sampling stage for the input signal, an analogue weighting stage for weighting the amplitude values with coefficients, an analogue summation stage and a time-discrete output stage.

According to the present invention, the receiving circuit can also be sampled with a lower frequency than the actual Nyquist frequency of the received signal. However, the requirements made of the anti-aliasing filter are increased in this case. Such undersampling enables economic sampling and digitization of high frequency signals in an EDM, specifically with the use of standard electronic components or standard semiconductor processes and, owing to the lower clock rates required for this, also with a moderate power consumption.

For undersampling where $$f_s < 2 \cdot f_{sig}$$

where: fs=sampling frequency,
fsig=signal frequency,
the requirements made of the filtering are significantly higher than in the case of sampling with double the signal frequency or more, for example the triple rule often used by engineers. In a conventional aliasing filtering upstream of the A/D conversion, as described in textbooks, a simple low-pass filter suffices, preferably having a correspondingly high order, for example $4^{th}$ or $6^{th}$ order, for instance.

The suppression of the aliasing bands at the frequencies fn_att given $$f_{n\_att} = f_{sig} + n \cdot f_s$$

where: n=E(N),
in the case of undersampling is intended here to be, however, for example at least 20 dB or more, in order to suppress the undersampling-dictated interference influences as a result of aliasing and spectral reflections to an extent such that a sufficient measurement accuracy can be achieved. In particular, the aliasing-relevant frequency ranges which would be superimposed with the measurement signal's frequency band of interest should in this case be damped, preferably to an even greater extent than the 20 dB mentioned by way of example above. In this case, the input filter is therefore embodied in particular as an aliasing filter upstream of the analogue-to-digital converter.

In order to be able to meet these requirements, a basic structure similar to a sampling intermediate frequency filter can be used, for example. One embodiment of such a filter for communication systems is described in WO 2009/062306, for example. WO 2011/082481 in the name of the same applicant describes an RF receiver circuit for parallel reception of more reception signals at different frequencies, such as occur in the case of GPS receivers.

With the filter used according to the invention in the receiving circuit of an EDM, it is possible to achieve high dampings, for example in the range of 20 dB or more, in particular in the frequency range of the image and/or aliasing bands. Furthermore, a filter constructed in this way does not require trimming of the chip during production, the damping characteristic is stable over the temperature range and the filter is also resistant to aging.

One development according to the invention can therefore be a combination of undersampling and a filter according to the invention. This enables an economic implementation of an HF sampling concept, especially since a practical realizability by means of standard semiconductor processes enables cost-effective manufacture of the receiving circuit as a single- or multi-chip system.

The so-called sampling intermediate frequency filters are known in telecommunications for receiving stages in wireless communication systems, such as Bluetooth or Zigbee, for instance. The principle used can be described as an embodiment of an FIR filter which is constructed with a discrete (or analogue) design and which carries out a time-quantizing sampling of the input signal. In this case, its design structure can be optimized for an implementation according to the invention in a departure from the traditional FIR normal form, but structurally it mainly constitutes an implementation of an FIR filter. In contrast to the purely digital FIR filter counterpart, however, the signal amplitude values in this case are not discretized or digitized, but rather processed in analogue fashion. In the case of corresponding configuration, this filter structure can achieve a high suppression of aliasing (or image) frequencies. Such filters can therefore carry out efficient conditioning of the received signal, by means of which—despite undersampling—aliasing effects can be suppressed to a high extent. Therefore, the output signal of the filter can be fed directly to an analogue-to-digital conversion (ADC), without a further aliasing filtering or a mixer stage. As a result of the correspondingly high suppression of the undesired spectral ranges, in this case the signal evaluation can be carried out even in undersampling operation—with a comparatively slow or moderately fast ADC—without giving rise here to signal corruptions that are to be taken seriously as a result of aliasing artifacts.

In comparison with known direct sampling approaches in an EDM, by means of the filtering according to the invention, the requirements made of the ADC with regard to the sampling rate (=temporal resolution) can also be relaxed significantly according to the invention, without giving rise here to losses in the signal quality. This also has a positive effect, for example, on the energy consumption and the space requirement of the circuit. One advantage of such a filter, moreover, is that practically no transient recovery time of the filter is required.

The use and structure of a filter in communication technology is different, and corresponding modifications and configurations of this basic concept are necessary in order to adapt such a structure to the EDM requirements. On account of the signals used during an electro-optical distance measurement and the evaluation requirements of said signals, an EDM requires different design criteria than a signal transmission system in telecommunications. Not only the signal characteristic used, but also the interference characteristic in an EDM is different. In this regard, the signal parameters to be evaluated in the case of an EDM, purely on the basis of the functional principle, are directed to accurately determining a signal propagation time, which is of no importance whatsoever in a communication system. In such information transmission systems, rather, a faithful reconstruction of the transmission signal waveform in analogue systems or an identification of binary states with a correspondingly high signal-to-noise ratio in digital systems is of importance. In communication systems, time shifts are taken into account at most in the context of so-called diversity reception, but not with the purpose of determining distance, but rather only for improving the reception quality. The design aims when developing an EDM are therefore different than in telecommunications, for which reason at all events known receiver circuits from communication technology cannot be used in an obvious manner nor one to one in an EDM.

The characteristics of the signals to be evaluated of an EDM are also not comparable with those of a communication system. Telecommunication systems only have the task of secure data reconstruction from the transmitted signals. The EDM described here employs packets of light pulses and it is necessary to determine the signal propagation time thereof to and from the surface of the backscattering measurement object. A highly accurate time determination can take place with the aid of the difference in the propagation time of a light portion guided via an internal reference path having a known length—in comparison with a light portion backscattered from the target object. In order to achieve a correspondingly high temporal resolution, the phase angle of the pulse is of relevance in this case—which can be evaluated according to the invention by means of the undersampling in a time-stretched representation.

On account of the high synchronism requirements made of transmitter and receiver in an EDM, these two circuit sections in the prior art are integrated together on a circuit board or even together in one chip. At most a carrier element with a photodiode is arranged in a movable fashion relative to the transmitter for alignment purposes, as is disclosed in EP 1 913 416, for instance. However, the associated signal generation, signal evaluation and signal processing of transmitter and receiver are in this case integrated on the same electronic unit.

Avoiding signal crosstalk is a major challenge in distance-measuring devices, particularly if HF sampling of the input signal is performed. In order to achieve an optimum separation of transmitter and receiver with regard to the transmission of electromagnetic interference, the transmitting circuit and the receiving circuit here can be obtained in each case by means of a separate printed circuit board or by means of integration into a respectively separate chip.

In this case, the input circuit—specifically at least the anti-aliasing filter according to the invention—and the A/D converter are integrated on a first chip as main chip. Furthermore, the main chip can for example also contain a processor core for performing the data processing required for ascertaining the distance. This chip can operate just with a single clock rate or clock signals derived integrally therefrom, as a result of which internal crosstalk is avoided or at least reduced by design. Moreover, the design of any necessary external filters, e.g. supply filters, etc., proves to be correspondingly simpler if they only have to be designed for one frequency. The absence according to the invention of a frequency- or phase-shifted mixed signal in the receiver, which signal in the prior art has to be fed to an avalanche photodiode for example in the form of a comparatively high voltage (highly specifically in contrast to the useful signals to be evaluated), can advantageously be used for reducing the crosstalk behavior. Signal crosstalk is a significant source of interference especially in the case of heterodyne mixing, since the mixed signal has to be present in a frequency- or phase-shifted fashion—that is to say asynchronously with respect to the rest of the evaluation circuit—and usually cannot simply be filtered out.

In accordance with this further aspect of the present invention, the receiver chip—or the receiver circuit board—is internally synchronous. The phase-shifted signals required for time stretching are generated in a second, separate transmitting chip or laser driver IC—or a separate transmitting circuit board.

In other words, in accordance with this partial aspect of the distance-measuring device, the transmitting unit and the receiving unit are embodied as two separate, independent electronic assemblies, in particular wherein the latter are connected to one another via a communication line and a clock synchronization line. Specifically, in this case the communication line is unidirectional, and its data transfer takes place synchronously with the clock of the clock synchronization line.

In order to minimize crosstalk, it is furthermore advantageous to minimize the number of connections between the two chips or circuit boards. In this case, communication which takes place only in one direction—preferably from the interference-sensitive receiving circuit toward the more resistant transmitting circuit—is also advantageous in this case. Consequently, the asynchronous signals on the transmitting circuit are not afforded any opportunity to undergo crosstalk with the receiving circuit. In the transmitter, a wide variety of circuit constructions can be used in this case, for example including the circuit described in EP patent application No. 11180282.

Moreover, between the two separate chips or circuit boards in the circuit board layout and instrument design it is possible to provide an EMI barrier (e.g. as ground surface in all printed circuit board layers, encapsulation of adjacent and potentially interfering circuit sections by ground surfaces, spacing apart the conductor tracks of the two circuits in all layers, etc.), which prevents or damps crosstalk via electromagnetic waves.

Moreover, both the transmitter and the receiver can be connected to the instrument supply via a dedicated, specifically tuned supply filter, as a result of which a coupling via the supply path can also be avoided or reduced.

The two chips can be coupled to one another and synchronized with one another for example via a clock line that is slow in comparison with the sampling or transmission frequencies. In the transmitting chip, the slow synchronization clock can be correspondingly stepped up again by means of a PLL and the required operating clocks can be generated therefrom, the synchronism being maintained. In order to achieve a good synchronization, the synchronization signal can be tapped off from the internal PLL on the main chip of the receiver, rather than from the crystal oscillator—whereby the transmitting and receiving units can be highly synchronized internally. Transmission of comparatively low frequencies for synchronization or communication firstly requires less energy and secondly allows the use of customary CMOS drivers instead of special communication drivers (such as, for instance, differential signals, LVDS, etc.). The electromagnetic emission behavior also decreases at lower frequencies. The configuration and driving of the transmitter can be effected via a data line that is synchronous with the clock line. In order to avoid crosstalk, said data line can be designed to be only unidirectional. In this case, by way of example, crosstalk in one direction can already be minimized by the choice of input and output impedances of the communication and synchronization lines, which is not possible in this form in the case of fast, impedance-matched communication lines.

Consequently, the two PLLs of transmitter and receiver are tuned to one another; that is to say that jitter possibly present in the PLL on the receiver chip is also transferred to the transmitter chip.

In other words, therefore, in accordance with this partial aspect of the invention, the asynchronous signals that cause difficulty with regard to crosstalk are locally shifted from the evaluation electronics toward a separately constructed transmitting part. This allows electromagnetic separation, specifically also by means of separate voltage supply circuits, and a synchronous, unidirectional communication from the interference-sensitive receiver in the direction of the transmitter, which sometimes is one of the primary perpetrators of interference in the EDM system. Moreover, the transmitter chip can largely be produced as an integrated circuit, for example as an ASIC having a very small structural size, which affords further advantages with regard to interference emission. Analogously, an integrated, compact construction of the receiver unit is also advantageous with regard to the appearance of interference signals.

An electro-optical distance measurement using the burst principle described can also be utilized to the effect of carrying out an evaluation with simultaneous coarse and fine measurement. As described, a TOF measurement of light pulses or pulse packets in conjunction with a correspondingly high temporal pulse spacing is well suited to obtaining an unambiguous distance measurement, but in this case a high-resolution time measurement, especially of an individual pulse, is difficult to realize, for which reason this is designated as coarse measurement.

In contrast thereto, a so-called fine measurement can be achieved by digitizing the pulse shape and determining the phase angle of one or a plurality of pulses with a high temporal resolution. On account of the signal periodicity, however, this cannot be assigned to a single distance unambiguously, but rather usually ambiguously. For the purpose of fine measurement, furthermore, the transmission signal can be emitted cyclically, for example per burst interval, with a phase offset relative to the—as described—synchronized receiver. Such an offset can be generated locally in the transmitter e.g. by means of a PLL or DLL unit in the transmitting unit, for example as a phase offset by in each case an integral part of the period of the transmission frequency. Per phase offset, therefore, the pulse shape is sampled by the receiver at a different location within the pulse, which brings about an increased resolution of the pulse shape (comparable with the time-stretched representation of periodic signals in the case of oscilloscopes with ETS sampling—although here the transmitter is shifted rather than the receiver). By means of the described separation of transmitter and receiver, the crosstalk can be kept small in this case despite the phase offset. The change in the phase offset can occur in each case at points in time at which no signals are emitted, that is to say for example between the active bursts. Possible transient or stabilization processes therefore have no influence on the emitted signal.

In other words, the distance-measuring device carries out a coarse measurement of the distance with the aid of the propagation time between emission of a burst and reception of the burst e.g. with the aid of an envelope curve of the burst, for example with a distance accuracy of greater than 10 cm, and a fine measurement of the distance, e.g. with the aid of a binary correlation of at least two signal waveform of the modulation within the burst, for example with a distance accuracy of less than 10 cm, in particular less than 1 cm. In this case, the coarse and fine measurements for the purpose of ascertaining the distance are effected with the aid of the same burst-modulated signal, that is to say in the context of the same measurement. Specifically, an unambiguity of the distance ascertained by means of fine measurement can be determined here with the aid of the coarse measurement.

According to the present invention, then, coarse measurement and fine measurement can be carried out simultaneously. Firstly, in this case it is possible to use one or a plurality of burst packets—or else the envelope curve of the burst packets—as a whole for the coarse measurement (with an unambiguity dependent on the burst repetition frequency), while at the same time the higher-frequency modulation within one or a plurality of bursts can be used for the fine measurement with shorter unambiguity lengths but increased measurement accuracy. As a result, an accurate and unambiguous distance can be determined with one measurement. This allows faster measurements since, for determining unambiguity, it is not necessary to have recourse to the multi-frequency measurements with a plurality of transmission/mixing frequencies known in the prior art (see e.g.: WO 2006/063740) or similar principles. However, such principles can still be used, for instance for improving the robustness of the measurement.

Specifically, in this case, the burst packet can also be phase-shifted cyclically (for example in each case during the burst pauses) relative to the sampling frequency, as a result of which only synchronous signals and thus reduced crosstalk are present in the receiver, as have already been described above. In particular, the above-explained unidirectional clock and control signal transfer from the receiver to the transmitter can be used in this case.

For the fine measurement in a direct HF sampling EDM, in which measurement an amplitude-quantified, digital representation of the received signal is present, the signal waveforms of the pulses can be correlated with a reference signal for the purpose of accurate time determination, that is to say that their signal waveforms can be shifted temporally relative to one another in such a way that the latter are brought to correspondence as well as possible. The temporal shift required for this purpose then corresponds to the signal propagation time difference between the pulses. As a result of the cyclic phase offset of the transmission signal, the latter is possible with a high temporal accuracy.

Moreover, the signals can be brought to correspondence by mathematical signal interpolations in a temporal and/or amplitude resolution, since, as a result of the filtering according to the invention, despite the undersampling practiced, the conditions for a mathematical signal reconstruction, specifically Shannon's theorem for the recovery of time-quantified signals, are fulfilled to a high extent. Such a correlation can also be carried out in the form of a binary correlation e.g. of a start pulse, guided and received via a known reference path, with a stop pulse guided over the measurement distance.

A wide variety of numerical methods are known for the signal correlation. By way of example, a binary correlation can be carried out in the simplest form. Such principles are described, for instance, in U.S. Pat. No. 6,067,331, DE 034 39 386 and DE 034 47 929. The correlation can be carried out either after measurement has been effected, or else in real time. Besides the binary correlation, alternatively further correlation methods can also be used, but they are usually associated with more computation complexity.

BRIEF DESCRIPTION OF THE DRAWINGS

The method according to the invention and the device according to the invention are described in greater detail purely by way of example below with the aid of concrete exemplary embodiments illustrated schematically in the drawings, further advantages of the invention also being discussed. Specifically in the figures:

FIG. 7b shows a plurality of timing diagrams of exemplary pulses within a burst signal with higher temporal resolution than in FIG. 7a;

The illustrations in the figures serve merely for illustrative purposes and should not be regarded as to scale.

DETAILED DESCRIPTION

Figure 1:
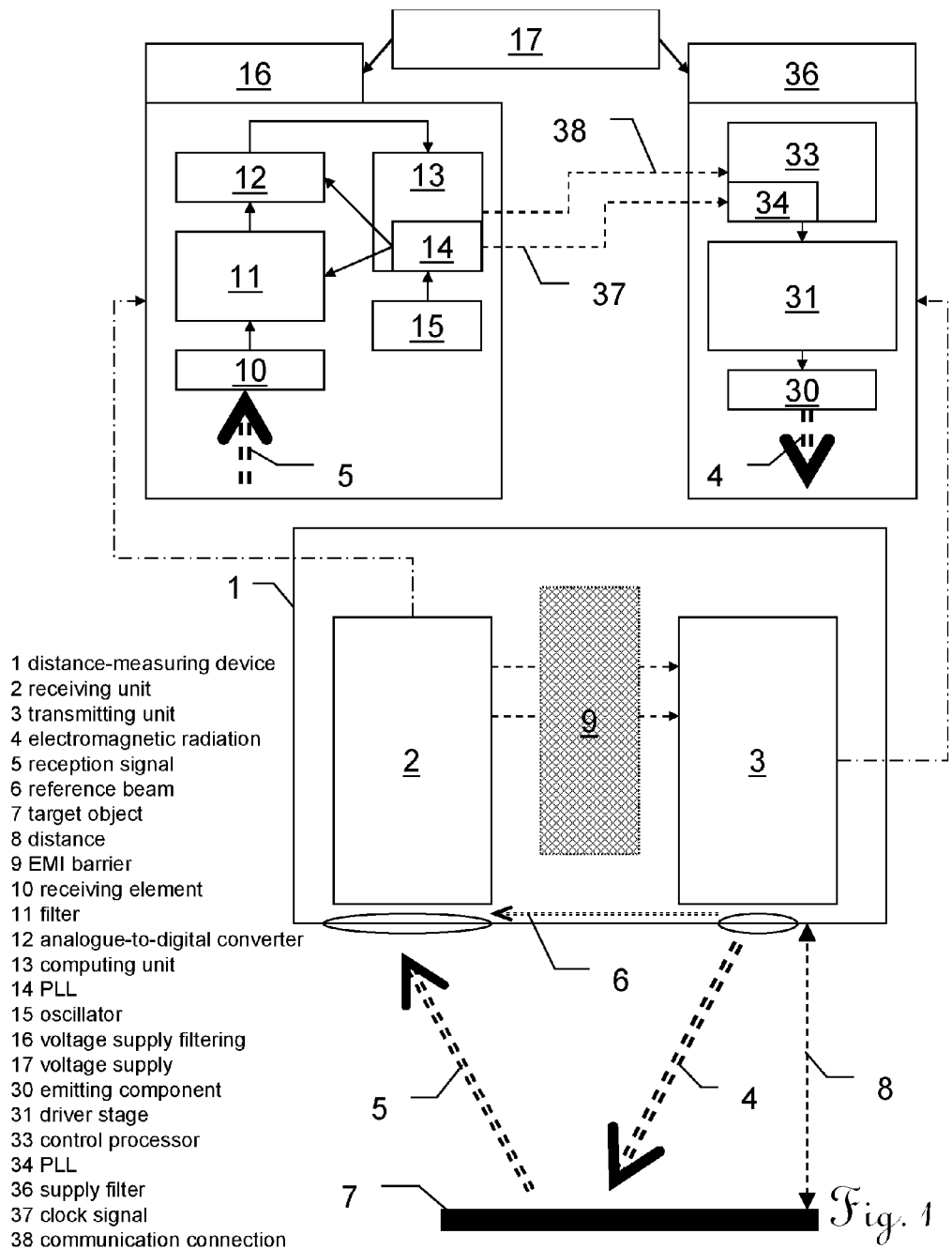
FIG. 1 shows a first embodiment of a distance-measuring device according to the invention as a block diagram.

FIG. 1 shows an embodiment of an optoelectronic distance-measuring device 1 according to the invention as a block diagram. The lower half reveals the two blocks—separated in accordance with a part of the invention—of the transmitting unit 3 and the receiving unit 2, which are separated from one another in terms of engineering regarding EMI by means of corresponding measures, which are symbolized by the EMI barrier 9. The target object 7 whose distance 8 is to be determined reflects at least part of the electromagnetic radiation 4 emitted by the transmitting unit 3 as a reception signal 5 back to the receiving unit 2. The upper half of the figure illustrates in each case a block diagram of an embodiment of the internal construction of the transmitting unit 3 and receiving unit 2. In this case, part of the emitted radiation can also be guided as a reference beam 6 via a reference path of known length to the receiving unit.

In this case, a respective dedicated or else a common receiving unit can be provided for the reference beam and the measurement beam.

The transmitting unit 2 with a control processor 33 and a driver stage 31 for the emitting components 30, which converts the electrical signals of the driver stage 31 into electromagnetic radiation 4 (e.g. an LED, a laser diode, etc.). A PLL 34 is illustrated in the control processor 33, which PLL can alternatively also be arranged in the driver stage 31 or externally. Moreover, control processor 33, driver stage 31 and PLL can be integrated in a common chip. The supply filter 36 connects the transmitting unit 3 to the voltage supply 17. The supply filter 36 can—depending on the interference that occurs—be embodied by a simple backup capacitor through to complex LCR filter networks and, if appropriate, can also contain a voltage stabilization and/or regulation or a step-up or step-down converter.

The receiving unit 2 converts received electromagnetic radiation 5 into an electrical signal by means of the receiving element 10, said electrical signal—if appropriate having been amplified—being sampled and filtered by a filter 11. In the case of optical radiation, the receiving element can be a photodiode, for example an avalanche photodiode having a corresponding bias voltage. The high frequency output signal of the photosensitive element can be conditioned prior to further processing by the filter 11 with a transimpedance amplifier (TIA), the conditioning comprising, in particular, impedance conversion, amplification and/or band limiting to a low order (for instance with an analogue, active or passive filter). By way of example, this amplifier stage can also be constructed, inter alia, with a circuit according to EP 2 183 865. Alternatively, the input stage of the filter 11 can also be designed in such a way that said input stage is adapted to the output characteristic of the receiving element 10.

The filtered reception signal at the filter output is digitized—that is to say quantified in terms of time and value—by an analogue-to-digital converter 12 and fed to a digital computing unit 13 (a microprocessor, DSP, FPGA, ASIC, etc.) for further processing. Furthermore, a PLL 14 together with an oscillator 15, for example a quartz oscillator, are connected. As usual in electronic circuit, here as well a filtering 16 (as already mentioned above) of the voltage supply 17 is illustrated, which can be positioned not only globally for the entire circuit, but also in a dedicated manner for individual components of the circuit.

FIG. 1 furthermore shows a division of the EDM system 1—as a partial aspect of the present invention—for avoiding or reducing crosstalk of the electrical signals, which likewise contributes to an increased signal quality and thus to a more accurate or faster measurement. In this case, an improved suppression of crosstalk effects can be achieved by the implementation of a local separation of signals which are asynchronous or not in phase for the signal evaluation. Specifically, in direct sampling systems, such asynchronous signals are perpetrators of interference in the measurement signals. In this case, by way of example, the receiving unit 2, which is particularly sensitive to interference, can be constructed in terms of circuitry in such a way that it has only signals synchronous with the evaluation circuit, in particular digital signals. By way of example, an individual oscillator 15, via a PLL 14, can supply the system 2 with clock signals which are all synchronized with one another, in particular with phase-synchronized clock signals whose frequencies are integral multiples. The filter 11, the ADC 12 and the evaluation electronics 13 are then clocked with these clock signals. By virtue of such a design, crosstalk effects can be avoided or reduced at least in comparison with an asynchronous system, or possible crosstalk takes place at points in time in which the effects on the signal evaluation are small or absent. If appropriate, by means of a correspondingly chosen phase offset of an interfering signal in the PLL 14, crosstalk that possibly nevertheless occurs can be avoided or at least reduced by being shifted to a point in time at which the detected measurement signal is not influenced or is influenced to a lesser extent.

In EDM designs, besides the presence of asynchronous signals or signals that are phase-shifted with respect to the evaluation clock, usually the transmitter 3, specifically the laser diode driver or LED driver 30, is one of the primary interference sources. In order to generate the short optical pulses having a high intensity which are required in a manner governed by the measurement principle, short current pulses having high peak values, steep edges and a correspondingly broad-edge frequency spectrum are required in the driving. Moreover, the modulation and emission frequencies, on account of the evaluation principle, are usually also in the same order-of-magnitude range as the evaluation frequency, which makes it more difficult or impossible for the interfering frequency range to be filtered out in a simple manner.

In order also to synchronize the transmitting circuit with the receiver, a clock signal output of the PLL 14 can also be led from the receiver 2 to the transmitter 3. Specifically, by transmitting a clock signal 37 synchronized by the receiver PLL 14 (instead of the oscillator signal), it is possible to achieve a high synchronization accuracy, which also precludes an oscillator-PLL jitter. Since the transmitting unit 3 likewise has a PLL 34, it is sufficient, for the purpose of synchronization, to transmit a signal 37 of relatively low frequency (relative to the high evaluation clock rates), which affords advantages both with regard to the interference emission and with regard to the power required for transmission. Moreover, for the transmission of such moderate frequencies, it is possible to dispense with specific signal drivers (such as LVDS drivers or the like), since simple output stages and input stages (e.g. using CMOS technology) are sufficient. As a result of the signal direction from the receiver 2 to the transmitter 3 it is possible (specifically also on account of the impedance ratios of signal output to signal input) for crosstalk in the opposite direction to be kept small.

Besides the synchronization of the transmitter 3 relative to the receiver 2, these two circuit sections must have a communication connection 38 for controlling the sequences required for the measurement. In order to avoid crosstalk, such a communication can likewise take place in the same direction as the clock signal 37—that is to say unidirectionally from the interference-sensitive receiver 2 toward the transmitter 3, which is usually the perpetrator of interference. In this case, the communication 37 can likewise be effected synchronously with the transmitted clock signal 38, for example as a unidirectional, synchronous serial interface, as a result of which communication-dictated interference can additionally be avoided.

The separation of transmitter 3 and receiver 2 also allows each of the two separate circuit sections to be given a specifically tuned supply filter 16, 36, as a result of which crosstalk via the voltage supply 17 can also be prevented or at least reduced. Furthermore, corresponding EMI barriers 9 (e.g. in the form of EMI interference arresters, guard banding mounts, shields, metal cages, shielding metal foils or metal sheets, etc.) can also be fitted between transmitter 3 and receiver 2.

In this case, transmitter 3 and receiver 2 can be separated locally, for instance by the use of respectively dedicated chips (FPGAs, ASICs, . . . ). The latter can indeed be physically accommodated on a common printed circuit board given corresponding configuration separated technically in terms of layout. A construction of the EDM system 1 with two separate printed circuit boards (where printed circuit boards can also be taken to mean circuits using thick-film or thin-film technology or ASICs) allows, if appropriate, more flexibility in the instrument design (e.g. also for optical alignment of the emission direction of the emitter 30 of the transmitter 3 relative to the receiving element 10 of the receiver 20—or vice versa, and of the component arrangement within the instrument 1). A higher suppression of crosstalk can be achieved by means of the separation and a corresponding instrument design.

In addition, besides a construction as dedicated components, a filter according to the invention can also be integrated together with other circuits into a semiconductor component, e.g. into an ASIC, by means of standard semiconductor processes. As a consequence, further system components such as the analogue-to-digital converter, the PLL, evaluation logic e.g. in the form of a digital computer or processor, memory cells, etc., can also all be integrated in a common receiver chip which requires only a minimal number of external components for operation. One embodiment of an EDM according to the invention can thus be realized by two chips, a transmitting unit and a receiving unit. If appropriate, the system can also be supplemented by an external processor, microcontroller or DSP, which can perform evaluation or interfacing tasks.

Figure 2:
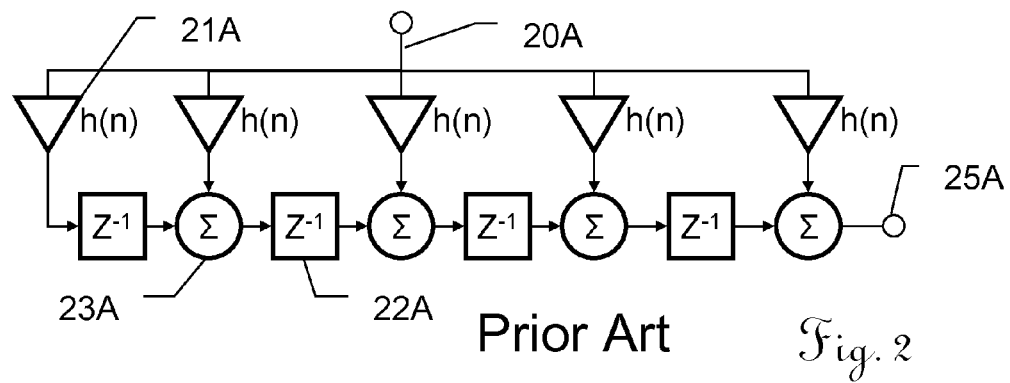
FIG. 2 shows an illustration of a known FIR filter structure as a block diagram.

FIG. 2 shows the known structure of an FIR filter, illustrated in the so-called second normal form, having a filter input 20A and a filter output 25A. It includes, in a plurality of (n) stages, elements for time delay 22A, for weighting with coefficients h(n) 21A, and summation elements 23A. For the sake of clarity, these elements are designated in each case by the same reference sign as their functional counterparts in the filter implementation according to the invention—but with "A" added at the end.

Figure 3:
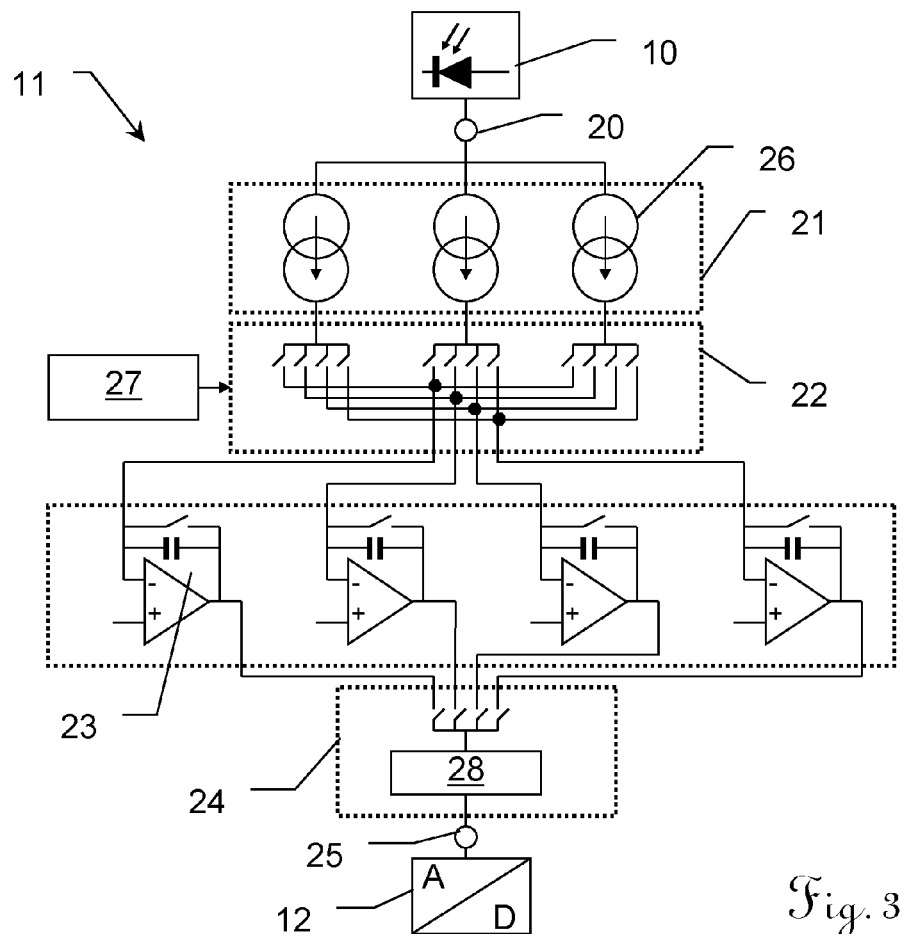
FIG. 3 shows an exemplary embodiment of a filter structure according to the invention as a block diagram.

FIG. 3 schematically illustrates one embodiment of a filter 11 according to the invention in the form of a discrete construction of a finite impulse response filter or FIR filter. In the case of EDMs in the prior art, FIR filter structures are used at most after digitization as purely digital filters which carry out the filtering with the aid of time- and value-quantified data of an ADC using software or digital hardware.

According to the present invention—in contrast to the software counterpart—analogue signals are sampled in a time-discrete fashion, accumulated in analogue form by means of weighting coefficients in a time-offset manner and the resulting analogue result is fed to an analogue-to-digital conversion. The filtering is therefore effected without a value quantification of the input signal (disregarding natural, physical quantizations that always occur in the form of individual photons, electrons, etc.). To put it another way, the filter operates in analogue fashion in the amplitude domain, but in discrete fashion in the time domain. In this case, the time discretization is effected in the form of a sampling of the input signal. Compared with the traditional, analogue counterparts, such a filter offers significantly more flexibility in the design of the filter characteristic, which can also be made adaptable online (e.g. via a digital interface for setting the filter coefficients). Steeper filters having better damping values can also be realized, and their transient behavior is likewise advantageous.

The concrete exemplary embodiment illustrated in FIG. 3 serves for schematically elucidating a possible construction principle and the functioning of a filter 11 according to the invention of an EDM receiving unit. The receiving unit 10 is connected to the filter 11, preferably via a transimpedance amplifier stage. The embodiment of the filter 11 illustrated by way of example converts the input signal 20 in the stage 21 with a current replicator into a plurality of entities of tapping currents; in this case, each entity can be weighted with a corresponding coefficient 26 (TAP coefficient), wherein the coefficients 26 can also be regarded as the respective amplification or translation ratios. In this case, the TAP coefficients 26 can be varied online e.g. via a configurable resistor network, variably drivable transistors, etc. Consequently, not only is it possible to influence the filter characteristic (for instance in order to adapt the filter to a present measurement mode), but it is also possible to compensate for temperature drifts or manufacturing tolerances that may occur.

A filter 11 according to the invention—owing to its high stability and high reproducibility accuracy in the semiconductor fabrication process—can also be embodied with coefficients that are fixed during production. By virtue of fixed filter coefficients—defined in the filter production process—of high accuracy and stability over temperature and time, it is possible to completely dispense with trimming of the filter 11 in the EDM production process. In one embodiment, therefore, the required adaptations can be restricted for example to adapting a gain factor of the received signal for optimally utilizing the ADC amplitude resolution. This adaptation of the gain can be effected for example during operation in a few discrete stages—for instance depending on the intensity of the optical reception signal.

This is followed by a switching matrix 22 controlled by the clock generator 27, the so-called current rotator, which, in a time-discrete fashion, can allocate each of the weighted analogue input entities to one of n analogue integrators 23.

The integrators 23 sum the applied input currents over a plurality of clock cycles, followed by a read-out cycle, in which the integrator value are output via the switches to the sampler 28 of the sampling stage 24 and to the filter output 25. After read-out the integrator is erased for the next cycle, which is also symbolized by the switches in the integrator stage 23. In one specific embodiment, optionally the sampler 28 of the output stage can also simultaneously be used as part of a sample & hold element of the downstream ADC.

Depending on the choice of coefficients 26 and the likewise configurable switching sequence of the switching matrix 22 and the sampling 24, it is possible to adapt the filter characteristic of the filter 11 used according to the invention. The transfer function of the filter 11 illustrated in the embodiment is:

$$H_{FIR}(z) = \sum_{k=0}^{N_t-1} TC_k \cdot z^{-k},$$

with $z=e^{j2\pi T_p}$, k=1, 2, . . . $N_t$–1 and $TC_k$ as TAP coefficients.

This corresponds to the transfer function of a known digital finite impulse response filter (FIR filter), which, however, here does not operate purely numerically, but rather with an analogue value representation. With the aid of this formula, the coefficients 26 and switching sequences of the stages 22 can be determined in a known manner.

According to the invention, only the output of the filter 11 is fed to an analogue-to-digital converter 12 and the further evaluation is carried out with time and value-quantified data. In this case, according to the invention, the analogue-to-digital converter operates according to the undersampling principle explained above, with a sampling rate below the Nyquist frequency of the filter input signal.

It is obvious to the person skilled in the art that, besides the FIR filter structure shown in the exemplary embodiment, according to the principle according to the invention of a time-discrete but value-analogue filter implementation, other filter structures can also be implemented analogously. If appropriate, for this purpose, the filter structure has to be converted in a manner deviating from the customary normal form, in order to be able to be integrated into an EDM as a time-discrete, but value-continuous filter according to the invention in particular with the aid of clocked switching matrices and analogue integrators. For instance, an IIR filter, but also other filter topologies, may be mentioned here as examples.

Figure 4:
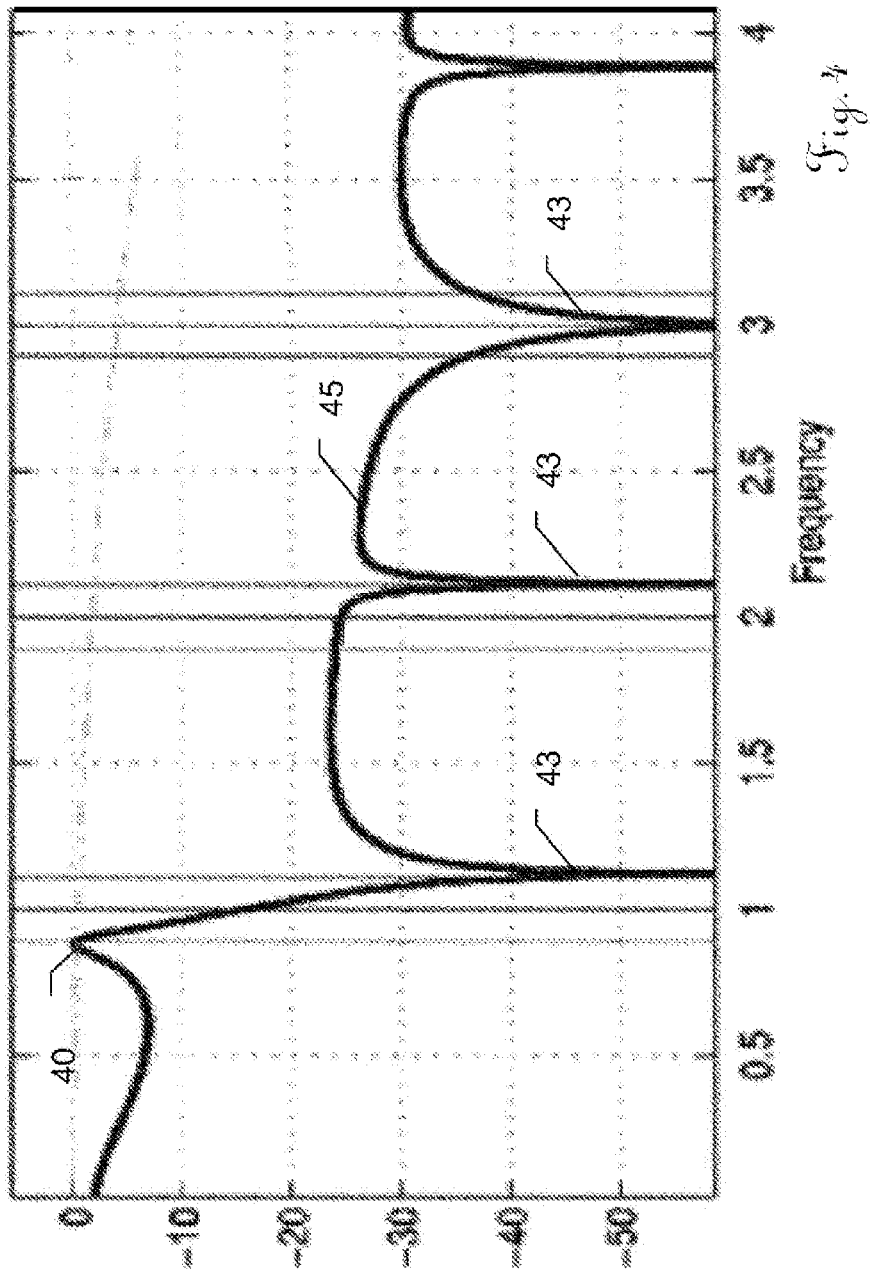
FIG. 4 shows an exemplary filter characteristic of a correspondingly configured filter according to the invention.

FIG. 4 illustrates an exemplary embodiment of a transfer function 45 which can be realized with a filter 11 according to the invention given corresponding configuration and parameterization. Such a transfer function 45 is used in the embodiment of an EDM receiving circuit described below. With such a filter according to the invention, the undesired aliasing products 43 are suppressed, and only the frequency desired during the evaluation, in particular during undersampling, or the desired frequency band 40 is allowed to pass. In this case, the filter characteristic 45 is designed in such a way that, besides a general high suppression of undesired frequencies by more than 20 dB, selectively so-called notches 43 with a far greater damping at the multiples of the frequencies 43 that are particularly relevant to aliasing also arise (at least approximately, in so far as is permitted by the configurability of the filter structure specifically chosen).

The EDM design presented below with specific numerical values shall be set out by way of example as one possible specific embodiment. The numerical values used in this case should be regarded in this case primarily as guide values for the orders of magnitude and ratios of the signals to one another, rather than as exhaustive, limiting indications of values.

In this case, the combination according to the invention of the filter 11 and undersampling is explained with reference to FIG. 5. The filter according to the invention is suitable in particular for such a combination, but can also be used with sampling that complies with the Nyquist condition, or else with heterodyne or homodyne mixing. The emitted light signal is for example in the form of burst packets having a burst repetition rate of, for example, approximately 78 kHz and a duty cycle (as the ratio of the active transmission time or burst duration to the reciprocal of the burst rate) of 1/10, for example. The burst packets are amplitude-modulated internally with a frequency of e.g. approximately 600 MHz. This is illustrated by the signal $f_{SIG}$ 60 in the upper diagram, wherein the spectral shape does not correspond to the actual spectrum of an emitted burst, but rather should be seen purely illustratively. The reception signal also contains a noise component, which is assumed here to be approximately white noise and is not illustrated. The frequency axis 61 is normalized to the sampling frequency explained later. The bar 62 represents the minimum required sampling frequency of two times $f_{SIG}$ 60 that is required for detecting the frequencies of DC up to the highest frequency of $f_{SIG}$ 60. The triangles A, B, C, D, E represent frequency band ranges that will be discussed below. In the embodiment shown schematically in FIG. 1, this should be assigned to the block 5, for instance.

The diagram underneath illustrates a first, analogue high-pass filtering 63 of the input signal. Inter alia, background light of low frequency (e.g. approximately constant sunlight or artificial light, usually modulated with double the power supply system frequency) can also be suppressed by means of this high-pass filtering. The diagram also shows the aliasing and image frequencies which would corrupt the measured values in the case of sampling with the sampling rate of 1, wherein the spectrum situated in the damping range of the high-pass filter 63 in the frequency range A is illustrated as already correspondingly damped. In the embodiment shown schematically in FIG. 1, this should be assigned to the block 10, for instance.

The third diagram from the top then illustrates the frequency response 65 of a filter used according to the invention. Since only a time quantification is effected according to the invention for the purpose of filtering, which time quantification can be realized merely by a switching process of analogue signals, this time quantification can be effected with high frequencies (e.g. in the gigahertz range, for instance). In the case of a simultaneous value quantification of an A-D conversion, such high sampling rates could only be realized with significantly higher outlay and power consumption. Therefore, the bandwidth 64 of this time quantification can also be chosen to be very high, in particular higher than double the signal frequencies of $f_{SIG}$ 60, specifically wherein this can also be realized with standard semiconductor structures. The frequency response of the filter according to the invention is tuned by corresponding design in such a way that the desired signal $f_{SIG}$ 60 is allowed to pass. The frequency bands in the frequency ranges C, D, E which lead to aliasing with the desired measurement signal $f_{SIG}$ 60 during sampling (with a sampling frequency at the value 1 of the frequency scale) are suppressed by the filter, in particular since they lie in the ranges of the notches of the frequency response 65. In the embodiment shown schematically in FIG. 1, this should be assigned to the block 11, for instance.

The diagram underneath illustrates the filter output signal from the point of view of an ADC that samples with a sampling rate of 1 on the frequency scale. In this case, the frequency ranges A, C, D, E are greatly damped relative to the frequency range B containing the useful signal, in particular in the range of the useful signal $f_{SIG}$ 60. In the embodiment shown schematically in FIG. 1, this should be assigned to the block 12, for instance.

The bottom-most diagram shows how afterward, for example in a known manner in the context of the signal evaluation, a digital filter, for instance the bandpass filter 69, can be applied to the digitized data. In the embodiment shown schematically in FIG. 1, this should be assigned to the block 13, for instance.

The application of the filter 11 in combination with undersampling, which can be regarded as one development of the present invention, achieves an economic and accurate signal evaluation and, consequently, also an accurate distance determination with lower hardware outlay and power consumption than purely analogue-filtered and high frequency sampling systems which comply with the Nyquist condition with regard to the modulation frequency.

Figure 5:
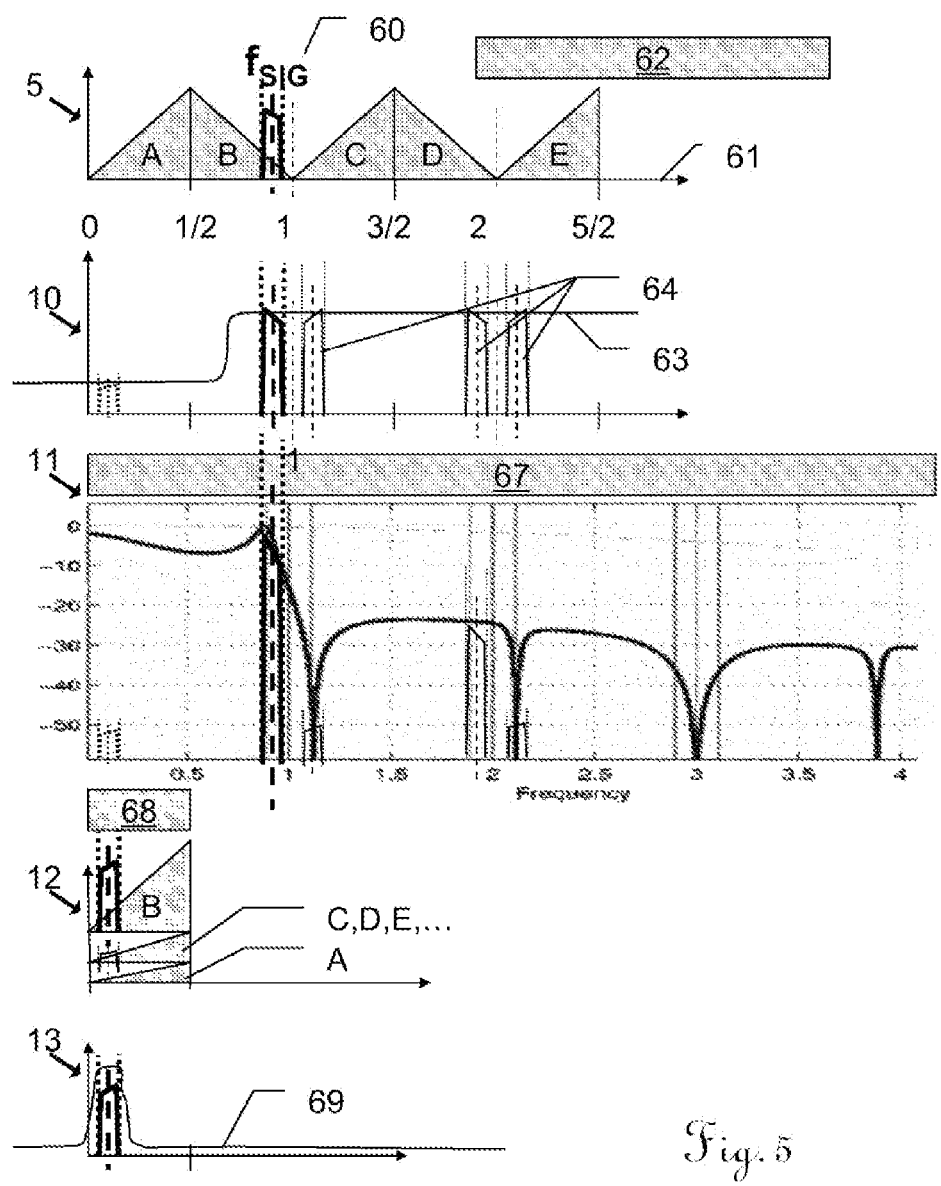
FIG. 5 shows a second exemplary embodiment of a signal processing according to the invention in an EDM.
Figure 6:
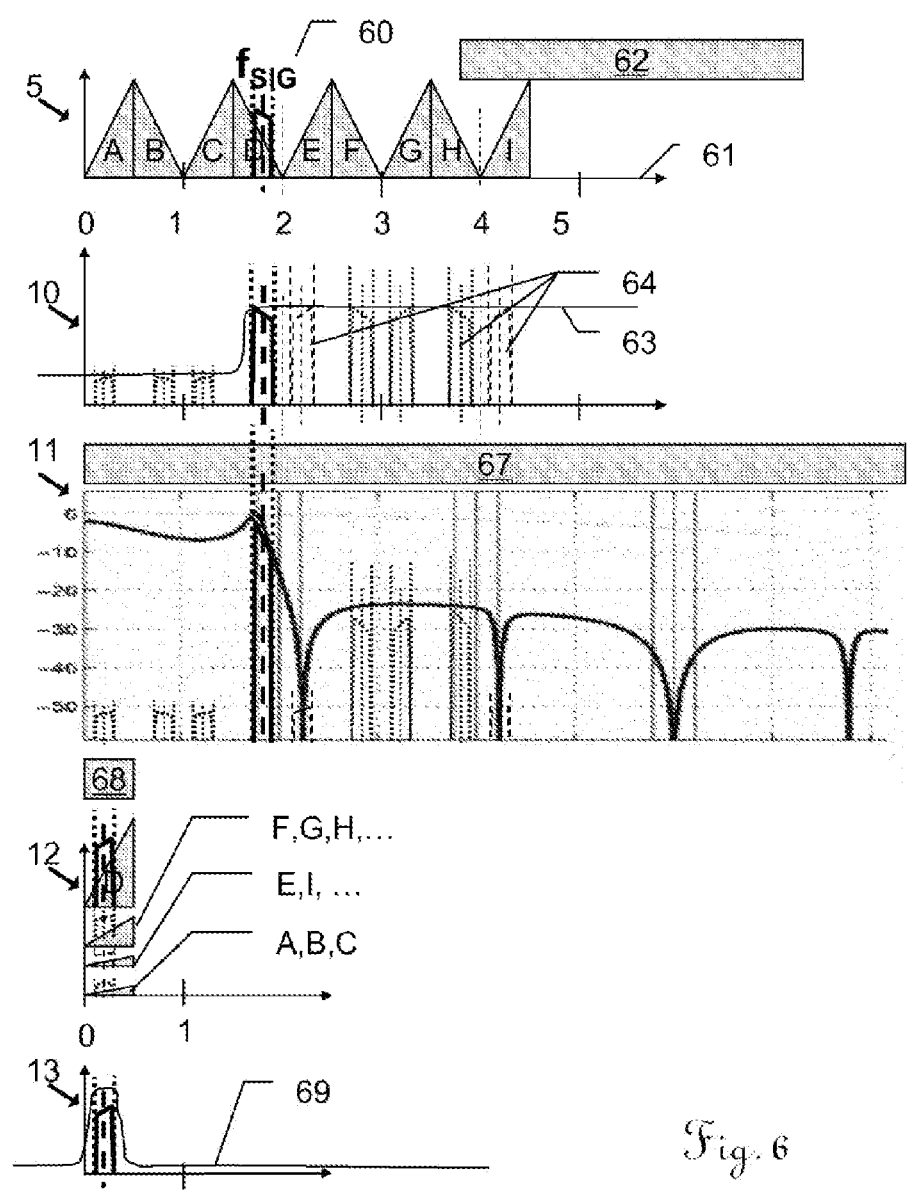
FIG. 6 shows a second exemplary embodiment of a signal processing according to the invention in an EDM.

FIG. 6 illustrates the principle of intermediate frequency sampling and undersampling with the aid of exemplary signal spectra in a second embodiment. In this case, the sampling frequency of the analogue-to-digital converter 12 is only half that in the previous embodiment in FIG. 5. Correspondingly, more aliasing and image bands A, B, C, E, F, G, H, I are present, the suppression of which takes place analogously to the description concerning FIG. 5. As a result of the sampling frequency of the ADC that is thus halved again, this can be effected more economically again and the hardware requirements can be reduced further. The software processing speed, too, can consequently likewise be correspondingly reduced. The diagrams show how, despite undersampling, the Nyquist condition can be complied with to a high extent and a signal reconstruction is thus possible. Undesired aliasing and image effects that occur specifically in the course of undersampling can be sufficiently suppressed by the filter according to the invention, in particular in the case of the corresponding filter design explained. As a result, a signal evaluation for distance measurement with high accuracy is achieved, wherein the system costs and the energy consumption can be reduced at the same time.

In a manner that is obvious to the person skilled in the art, it is also possible to realize further embodiments with a filter according to the invention, wherein parameters such as undersampling ratio, number of filter taps, filter coefficients, etc. can be adapted or optimized in accordance with the requirements of the specific distance-measuring device in line with engineer practice.

Figure 7A:
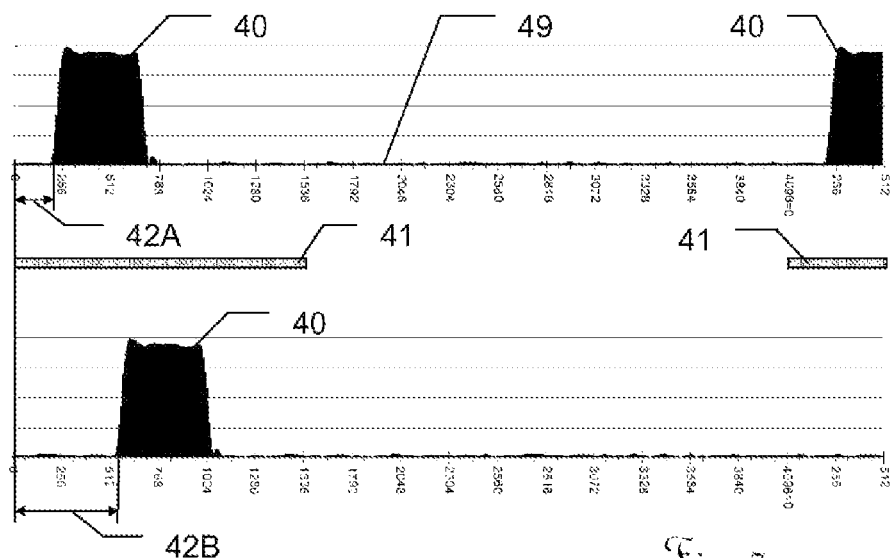
FIG. 7a shows a timing diagram of an exemplary burst signal for two different distances.

FIG. 7a shows two examples of a coarse measurement for distance determination with the aid of a propagation time 42A, 42B (TOF) measured with the aid of the envelope curves of the burst packets 40 in the case of two different distances. Two of the burst packets 40 emitted periodically with the burst frequency and the intervening dead time 49 are illustrated here at the top. The distance-measuring device carries out undersampling with the sample numbers illustrated on the abscissa. Specifically, in this case, it is also possible to sample only the partial range designated by the reference sign 41 after the transmission of the pulse, in which partial range a return signal is to be expected if the target is situated within a distance measurement range predefined thereby. In the exemplary embodiment described below, however, continuous sampling is effected. A first, coarse distance measurement can be carried out with the aid of the number of samples from the transmission to the reception of the burst (specifically the envelope curve thereof). In the case of the illustrative example of a burst rate of 78 kHz and sampling of 4096 samples per period, this results in a temporal resolution of 3 ns at a sampling rate of approximately 320 MHz of the analogue-to-digital conversion. The output of the filter 11 can in this case be digitized e.g. with a 10-bit ADC. An ADC from the inexpensive standard range of a manufacturer can therefore be used. Alternatively, such an ADC can be realized by incorporating a corresponding IP core into the evaluation unit, for example jointly with the filter 11 as a single-chip solution,—wherein this can be produced with standard semiconductor processes on account of the moderate sampling rate and resolution.

Since the filter 11 used according to the invention requires practically no or a very short transient recovery time, according to the invention it is possible to employ comparatively short bursts—theoretically through to individual pulses. The fast transient response of the filter 11 according to the invention also enables a more accurate coarse measurement, since after the filter the first pulse of a burst already has a high signal quality, such that its temporal signal position can be determined accurately for the coarse measurement. In the case of analogue filters, on account of the filter transient recovery, the first pulse or the first pulses can be subjected to great signal distortions and/or dampings, which restricts the achievable accuracy of the coarse measurement. For the fine measurement too, in the case of analogue filters, the first pulse (or the first pulses) of a burst should usually be discarded since the signal waveform thereof is distorted and/or damped by transient processes.

In the abovementioned example of a phase offset in the transmitter of 1/16 of the pulse period per burst, it is possible, by way of example, with the aid of 16 bursts, to determine the pulse shape with high temporal resolution, in particular to 1/6 of the pulse period and also correspondingly higher with the aid of the amplitude resolution and interpolation. The combination of the advantages mentioned above enables a high measurement rate in the kHz range to MHz range. The resolution and measurement accuracy can be improved even further by the use of multiple measurements, interpolations and averagings, for example together with a maximum likelihood evaluation, wherein measurement rates of more than one kilohertz are still achievable.

With the aid of the TOF time 42A or 42B illustrated, it is thus possible, purely with the aid of the sampling rate, to ascertain a coarse distance with an accuracy of approximately 30 m—correspondingly more accurately in the case of interpolation, which predefines the required unambiguity range of the fine measurement in order to achieve an accurate and unambiguous total measurement. In order to further improve the unambiguity, the so-called differential frequency method can also be employed, for example.

Figure 7B:
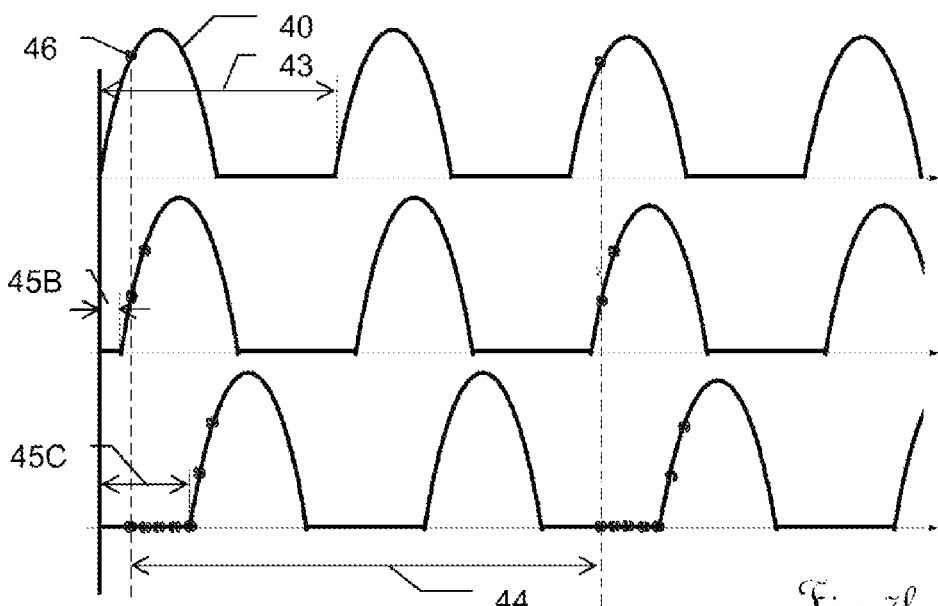

FIG. 7b shows by way of example timing diagrams of the pulse modulation within the burst in the form of pulses 40 having a period duration 43 as modulation frequency. Practical embodiments can also operate with different modulation shapes than the pulse shape shown here, e.g. at least approximately rectangular, trapezoidal or triangular pulses, etc. At the sampling instant 46, the amplitude is digitized, with a sampling rate of 1/sampling period 44. In the diagram underneath, the signal 40 is phase-offset relative to the upper signal by the time 45B, once again by 1/16 of the period duration of the signal in the example illustrated. This phase offset can for example be changed per burst packet, can be kept constant during the burst packet 40 and can be changed in the dead time 49 between emission, in particular in order to avoid possible transient processes during the actual measurement signal. The bottom-most diagram illustrates a phase offset of 6/16 and the respective sampling instants 46 of the signal 40. The internal resolution thus achieved in the signal waveform 40 as a result of the sampling instants is clearly evident. The already described shifting—which develops the invention—of the transmission signal makes it possible to achieve an increased temporal resolution even in the case of a strictly synchronous design of the receiver circuit. In this case, the phase-shifted signal occurs only in the transmitting circuit, which—according to the partial aspect of the invention—is separated in terms of EVM technology and/or spatially, and interference as a result of signal crosstalk can thus largely be avoided. Only a synchronization and data transfer from the receiver to the transmitter and the voltage supply electrically connect the transmitting and receiving units to one another—as in the exemplary embodiment explained here and illustrated in FIG. 1.

The signal propagation time can for example also be evaluated in the form of a correlation of transmission or reference signal with the reception signal, for example with the aid of a binary correlation of the two signal waveforms, wherein the temporal offset with the highest correspondence of the signal waveforms corresponds to the signal propagation time, which, during the correlation, can also be determined with a temporal resolution below the sampling rate determined by the sampling rate of the ADC. In particular since, according to the invention, a reconstructibility of the signal waveform from the digitized data is provided to a high extent by the filter 11 despite the undersampling.

The filter 11 according to the invention has, in comparison with its analogue counterparts, a stabler propagation time (also designated as delay or phase offset) from the filter input to the filter output, in particular also with regard to temperature drift and aging phenomena. Although a filter 11 according to the invention can have a multiply longer propagation time than a purely analogue filter from the prior art, said propagation time is significantly stabler. For a highly accurate time determination, such as is required for the distance measurement, the absolute magnitude of the filter propagation time is of secondary importance compared with the stability thereof, since a constant absolute value can be numerically compensated for in a simple manner, especially with the use of a comparative measurement with a reference path of known length, or—owing to the high stability—also only once in the context of a factory calibration.

By way of example, in further succession it is possible to carry out an evaluation with an—in particular phase-synchronous—accumulation of a plurality of measurements of the burst signals or pulses within the bursts or burst. However, such a periodic accumulation also results in spectral periodicities. With the filter 11 according to the invention, in which, as a result of the choice of the corresponding structure and coefficients, the notches 43 of its frequency response are placed on the undesired frequency ranges accumulated by the accumulation, it is possible to achieve a further improvement in the measurement result to be evaluated and thus a more accurate and more robust distance measurement.

Figure 8:
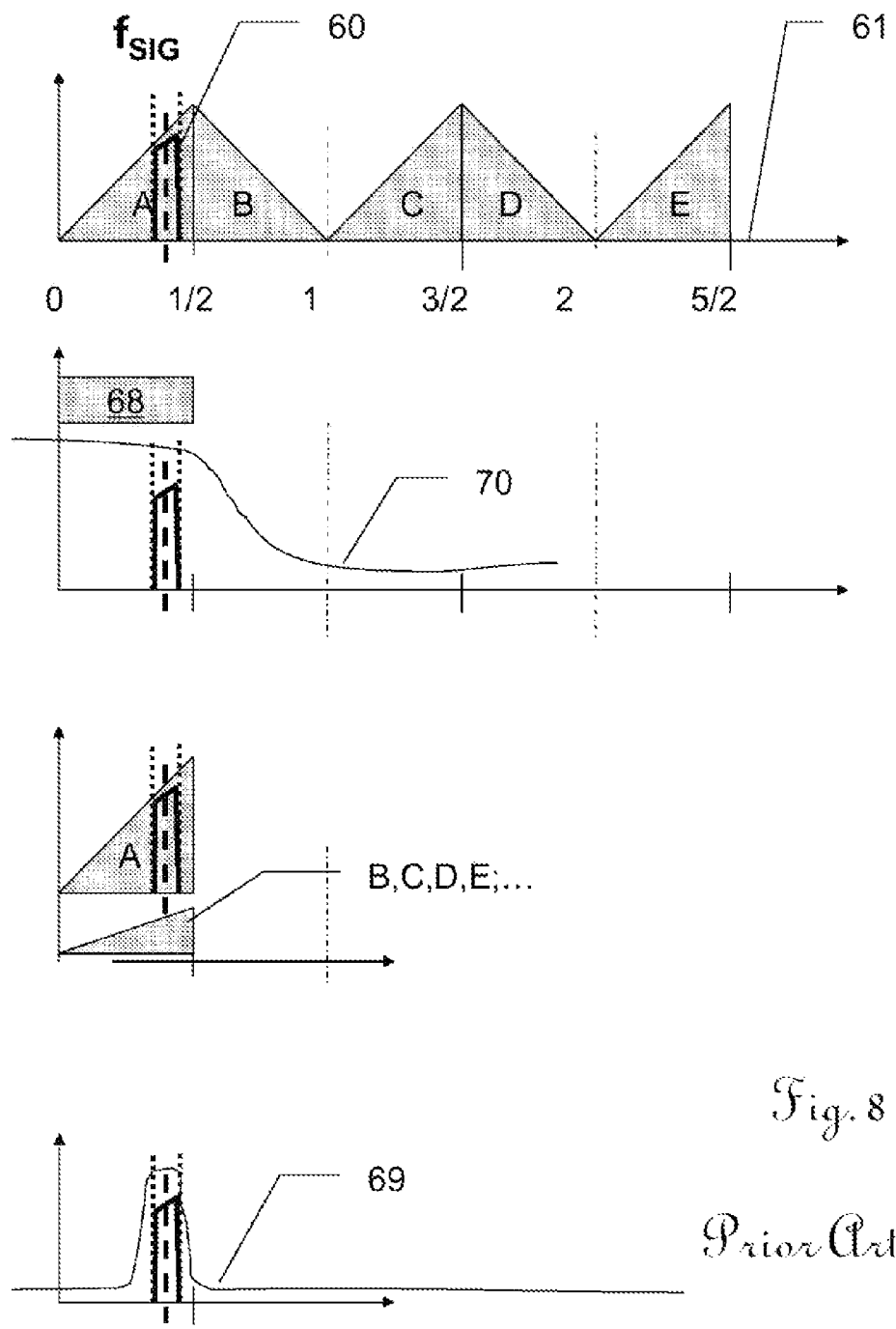
FIG. 8 shows the fundamental stages of the signal processing of a direct sampling EDM according to the prior art.

FIG. 8 shows an EDM without a heterodyne mixer stage with direct sampling of the high frequency input signal according to the prior art in a sequence of spectral diagrams similar to that in FIG. 5 or FIG. 6. The topmost diagram once again illustrates the input signal $f_{SIG}$ 60 and a division into frequency bands A, B, C, D, E. The diagram underneath illustrates an analogue aliasing filtering with the characteristic 70, which damps frequencies above the Nyquist frequency 68 of sampling at half the sampling frequency. Since the characteristics 70 of analogue filters realized in practice are restricted, however, this is not possible arbitrarily, in particular not possible to the optimum extent theoretically required. An analogue filter having a desired frequency characteristic for sufficient suppression of the aliasing frequencies is not only difficult to realize but also problematic with regard to temperature drift, aging phenomena of the components, stability, linearity of the phase response, etc. Underneath, the third diagram illustrates the result after the time and value quantization of the A/D conversion.

The bottom-most diagram shows a digital filtering—then possible in the digital representation—e.g. an FIR filtering, which allows steep filters with high dampings with which the signal spectrum required for the measurement can be extracted. In this case, in the prior art, given a modulation frequency of 600 MHz, an analogue-to-digital conversion with a rate of 1.2 GHz is required, whereas in comparison therewith, in the case of the embodiment according to the invention explained above, only an analogue-to-digital conversion with a sampling rate of for example is carried out, as is illustrated in FIG. 6, for instance. The filtering according to the invention with a time-discrete but value-analogue construction makes possible, however, despite the undersampling, a very high signal fidelity of the digital representation, in particular in the criteria that are essential for the propagation time distance measurement. The fact that this reduction of the hardware requirements allows the system costs to be reduced is obvious to the person skilled in the art, in particular since a 1.2 GHz ADC having a resolution of 10 bits at the present time should indeed be counted among the high-end products, which also cannot be readily integrated into a custom ASIC.

Figure 9:
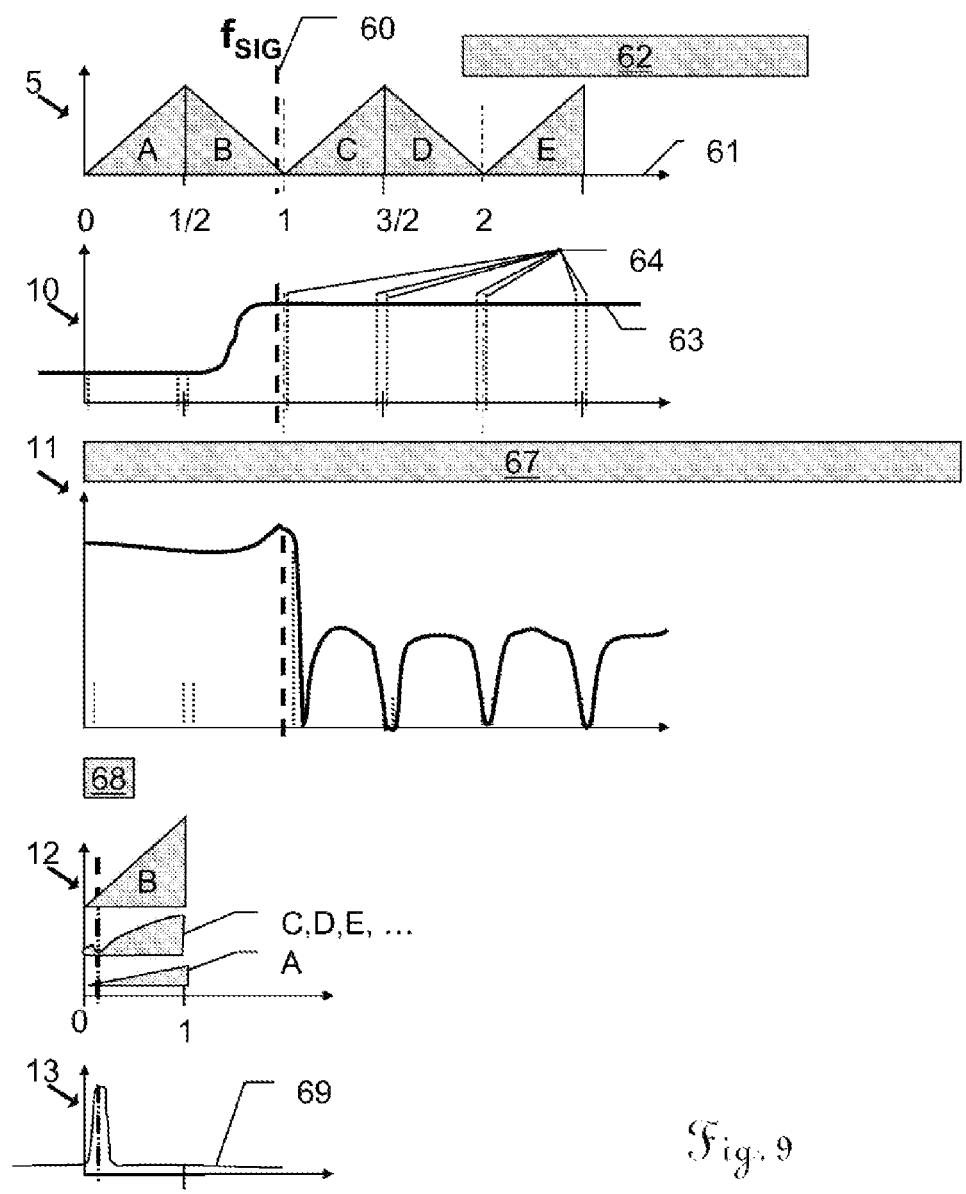
FIG. 9 shows a third exemplary embodiment of a signal processing according to the invention in an EDM.

FIG. 9 shows a further embodiment of a signal processing in a receiving unit 2 of an EDM 1 according to the present invention. The sequence of the illustration is established identically to that in FIG. 6, but the frequency ratios are varied. In this case, the modulation frequency 60 of the transmission signal 4 is very close to the sampling frequency at a value of 1 on the frequency axis, which here is normalized to the sampling frequency of the ADC 12. In this embodiment, therefore, the sampling frequency of the ADC 12 is very close to the modulation frequency of the transmitting unit 3. The signal components that are close to DC are again damped in the input, for example by an analogue high-pass filter 63, which can be formed by an amplifier stage in the receiving element 10. In this case, the filter 11 according to the invention is once again configured in such a way that the notches of the filter structure chosen coincide with the aliasing ranges. The height of the dotted lines at the aliasing and image frequencies once again symbolizes the amplitude values of these frequency components after the filtering which are superposed during the sampling of the ADC 12. This illustration is intended to symbolize the damping of these undesired frequency components, wherein the illustration should be regarded as purely illustrative and not to scale. Exact coincidence of all aliases with the notches may, depending on the specific filter structure chosen (number of taps, coefficients, etc.), not always be possible, nor absolutely necessary according to the invention, especially since the filter 11 according to the invention has a comparatively high damping (e.g. of 20 dB or more) even somewhat beyond the notches in the stop band. The spectra C, D, E illustrated during the sampling 12 symbolize the effect of said notches by a depression in the illustrated frequency response in the region of the desired measurement signal from spectrum B. In the embodiment shown, for instance, the aliasing frequency directly adjacent to the signal frequency actually evaluated is deliberately tolerated and allowed to pass by the filter structure 11 with relatively little damping. The overall performance of the EDM 1 can nevertheless achieve a sufficient distance measurement accuracy, especially on account of the stated advantages such as filter stability over temperature and time, the constant filter propagation time, etc.

Figure 10:
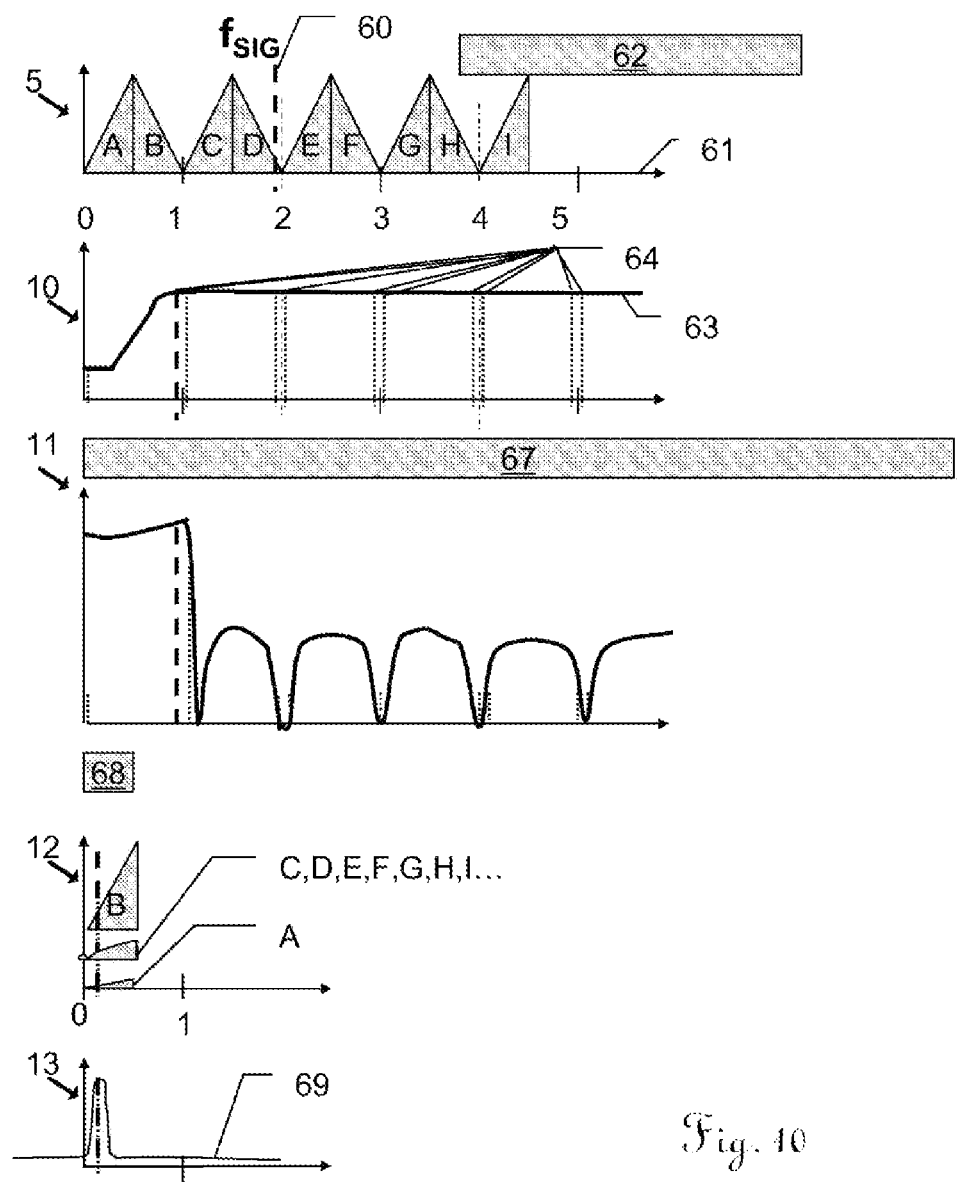
FIG. 10 shows a fourth exemplary embodiment of a signal processing according to the invention in an EDM.

FIG. 10 shows a further embodiment, in which the sampling is performed with a halved sampling frequency—in comparison with FIG. 9. In this case, the signal mirrored down by the ADC sampling is evaluated at approximately half of the modulation frequency of the transmitter. In this case, in this embodiment, the other, undesired signal components, in particular those which are superimposed directly with the evaluated signal as a result of aliasing, are suppressed to a sufficient extent by the filter according to the invention. Correspondingly, the filter 11 has more taps and thus more notches than the filter of the previous embodiment from FIG. 9, in order to achieve a similar distance measuring performance. The outlay in the filter 11 is increased as it were in favor of a lower outlay in the ADC 12.

Weighing among the embodiments shown here by way of example, or further optimizations of the concept according to the invention, should in this case usually be effected with the aid of economic assessments e.g. in the course of an optimization of costs.

What is claimed is:

1. An electro-optical distance-measuring device comprising:
   a transmitting unit comprising a laser diode and a laser diode driver, for emitting intensity-modulated optical radiation, as burst-modulated radiation having a burst rate, a burst duty cycle and a pulse frequency within a burst,
   a receiving unit for receiving a portion of the optical radiation, said portion being reflected from a target object, by means of a photosensitive electrical component and for conversion into an electrical reception signal,
   an input filter for filtering the reception signal,
   an analogue-to-digital converter for digitizing the filtered reception signal, and
   an electronic evaluation unit, which ascertains a distance from the distance-measuring device to the target object on the basis of a signal propagation time with the aid of the digitized reception signal, wherein:
      the input filter comprises a filter structure implemented in a time-discrete and value-continuous fashion having a time-quantifying, sampling switching stage for the reception signal, a weighting stage for weighting analogue amplitude values with coefficients, an analogue summation stage and a time-discrete output stage, wherein the input filter is embodied as an aliasing filter upstream of the analogue-to-digital converter.

2. The distance-measuring device as claimed in claim 1, wherein the analogue-to-digital converter has a sampling rate below double the frequency of the intensity modulation of the optical radiation.

3. The distance-measuring device as claimed in claim 1, further comprising a time-discrete output stage of the input filter that is simultaneously a sample and hold stage of the analogue-to-digital converter.

4. The distance-measuring device as claimed in claim 1, wherein the reception signal is filtered upstream of the analogue-to-digital converter by means of an FIR filter structure constructed using hardware, wherein the FIR filter structure includes:
   an input stage that generates a plurality of analogue entities of the reception signal,
   a weighting stage that weights the analogue entities in each case with a coefficient,
   a switching stage that allocates the weighted entities to a number of analogue summation elements sequentially and in a time-discrete manner, and
   an output stage, which makes available the values of the summation elements sequentially at a filter output and subsequently resets the summation elements.

5. The distance-measuring device as claimed in claim 1, wherein the FIR filter structure has a configurable frequency characteristic by virtue of the weighting stage having configurable coefficients and/or the switching stage having a configurable sequence.

6. The distance-measuring device as claimed in claim 1, wherein the filter structure is configurable in such a way that frequencies greater than the sampling rate experience a damping of at least 20 dB, wherein those aliasing frequency bands which lead to aliasing being superimposed on the reception signal, on account of the undersampling, with selective notches in the ranges of the undesired aliasing frequency bands, experience a damping of at least 40 dB.

7. The distance-measuring device as claimed in claim 1, wherein it is embodied as a handheld and battery-operated laser distance-measuring instrument using visible laser light and having a distance measuring range of at least 1 m to 50 m and a distance measuring accuracy at least in the mm range.

8. The distance-measuring device as claimed in claim 1, wherein the transmitting unit and the receiving unit are embodied as two separate, independent electronic assemblies, wherein the latter are connected to one another via a communication line and a clock synchronization line, which synchronizes clocks of the transmitting unit and of the receiving unit, wherein the communication line is unidirectional and the data transfer of which takes place synchronously with the clock synchronization line.

9. The distance-measuring device as claimed in claim 1, wherein the transmitting unit with a phase offset circuit carries out the intensity modulation with an adjustable phase offset relative to the sampling in the receiving unit, wherein the phase offset is changed in each case in pauses between two bursts.

10. The distance-measuring device as claimed in claim 1, wherein:
    a coarse measurement of the distance is effected with the aid of the propagation time between emission of a burst and reception of the burst with the aid of an envelope curve of the burst with a distance uncertainty of more than 10 cm, and
    a fine measurement of the distance is effected with the aid of a signal waveform of the modulation within the burst with a distance uncertainty of less than 10 cm,
    wherein the coarse and fine measurements for ascertaining the distance are effected with the aid of the same burst-modulated signal,
    specifically for resolving ambiguities in the distance ascertained by means of fine measurement with the aid of the coarse measurement.

11. The distance-measuring device as claimed in claim 1, wherein the receiving unit comprises a photodiode.

12. The distance-measuring device as claimed in claim 1, wherein the analogue summation elements comprise analogue integrators.

13. An electronic receiver chip configured to be used with a distance-measuring device, the electronic device configured to:
    emit high frequency amplitude modulated optical radiation,
    receive a portion of the optical radiation, said portion being reflected from a target object, by means of a photosensitive electrical receiving element and conversion into a high frequency electrical reception signal,
    filter the high frequency reception signal,
    digitize the filtered reception signal, evaluate the digitized signal for determining the signal propagation time between emission and reception for determining the distance with the aid of a signal propagation time, wherein:
       the filtering is effected by means of a filter structure that operates in a time-discrete and value-continuous fashion, having a time-quantifying, sampling switching stage for the reception signal, a weighting stage for weighting analogue amplitude values with coefficients, an analogue summation stage and a time-discrete output stage, wherein the input filter is embodied as an aliasing filter upstream of the analogue-to-digital converter.

14. The electronic receive chip according to claim 13, wherein the electronic receiver chip comprises an ASIC.

15. A distance-measuring method comprising:
emitting high frequency amplitude modulated optical radiation,
receiving a portion of the optical radiation, said portion being reflected from a target object, by means of a photosensitive electrical receiving element and conversion into a high frequency electrical reception signal,
filtering the high frequency reception signal,
digitizing the filtered reception signal,
evaluating the digitized signal for determining the signal propagation time between emission and reception for determining the distance with the aid of a signal propagation time, wherein:
the filtering is performed by a filter structure that operates in a time-discrete and value-continuous fashion, having a time-quantifying, sampling switching stage for the reception signal, a weighting stage for weighting analogue amplitude values with coefficients, an analogue summation stage and a time-discrete output stage, wherein the input filter is embodied as an aliasing filter upstream of the analogue-to-digital converter.

16. The method according to claim 14, wherein:
the digitization is effected with an undersampling with a sampling rate below double the frequency of the amplitude modulation with a sampling rate which is at least approximately equal to or less than the frequency of the amplitude modulation.

17. The method according to claim 14, wherein:
the emission is effected with a variable phase offset relative to the digitization, wherein the digitization is effected with a constant frequency, wherein the phase offset is varied during emission in pauses between the emission of two pulse packets, specifically with a phase offset by part of the pulse period of the high frequency amplitude modulation.

18. The method according to claim 14, wherein:
coarse measurement of the distance is effected by the signal propagation time of an envelope curve of the received portion being determined, and
fine measurement of the distance is effected by the propagation time being determined with the aid of a phase angle of the high frequency amplitude modulation within the received portion of the burst pulse packet;
wherein ambiguities in the evaluation of the fine measurement are resolved with the aid of the coarse measurement.

19. The method according to claim 14, wherein the filtering structure comprises an FIR filter structure.

20. The method according to claim 14, wherein the propagation time is determined with a binary correlation of the amplitude modulation and a reference signal.

21. The method according to claim 14, wherein the high frequency amplitude modulated optical radiation includes burst modulation of the optical radiation as high frequency modulated pulse packets followed by pauses.

* * * * *